United States Patent [19]
Werth

[11] Patent Number: 5,643,352
[45] Date of Patent: Jul. 1, 1997

[54] REACTIVE IRON MATERIAL FOR USE IN A HYDROGEN-GENERATING PROCESS IN AN ELECTRICAL VEHICLE

[75] Inventor: John Werth, Princeton, N.J.

[73] Assignee: H Power Corporation, Belleville, N.J.

[21] Appl. No.: 477,523

[22] Filed: Jun. 7, 1995

Related U.S. Application Data

[63] Continuation-in-part of PCT/US93/03825 Apr. 23, 1993 and a continuation-in-part of Ser. No. 52,561, Apr. 23, 1993.

[51] Int. Cl.$^6$ .................................................. B22F 1/00
[52] U.S. Cl. .................................................. 75/255; 429/12
[58] Field of Search .................................. 75/255; 429/12

[56] References Cited

U.S. PATENT DOCUMENTS 5,338,508  8/1994  Nitta et al. ........................... 420/120
5,510,201  4/1996  Werth ...................................... 429/17

*Primary Examiner*—Charles T. Jordan
*Assistant Examiner*—Anthony R. Chi
*Attorney, Agent, or Firm*—Salzman & Levy

[57] ABSTRACT

The present invention features a new iron material for use in situ with a hydrogen-air fuel cell, to generate the hydrogen to fuel the fuel cell. The iron material is made up of freshly-ground particles of iron, ranging in diameter size from approximately 25 to 1,200 μm, with an average-sized distribution having at least twenty per cent (20%) of the particles less than about 300 μm in diameter, and having an average particle density approximately ranging from about 1 to 7.8 g/cc, and a surface area greater than approximately 0.001 meters$^2$/g. The particles are in a freshly ground state, in situ, for enhancing their reactivity in producing hydrogen for the fuel cell.

9 Claims, 2 Drawing Sheets

REACTIVE IRON MATERIAL FOR USE IN A HYDROGEN-GENERATING PROCESS IN AN ELECTRICAL VEHICLE

RELATED PATENT APPLICATION

This patent application is a continuation-in-part of PCT application, PCT/US 93/03825 (which was filed Apr. 23, 1993); and the U.S. patent application, Ser. No. 08/052,561 (which was also filed Apr. 23, 1993). Each was assigned to a common assignee.

FIELD OF THE INVENTION

The present invention pertains to active iron material for use in hydrogen-generating beds aboard an electrical vehicle and, more particularly, to a new iron material formed in situ in an electrical vehicle for generating hydrogen to produce electrical power within a fuel-cell apparatus.

BACKGROUND OF THE INVENTION

The electrical automobile is currently under intense development due to the twin needs to reduce air pollution and conserve fuel resources.

One of the major difficulties in the development of the electrical automobile is supplying the power for the electrical drive motors. Such power is currently furnished by batteries. Present battery technology, however, is not capable of providing the energy needed to run the automobile over extended distances.

In addition, the present-day battery systems are usually deficient in providing the majority of the other major requirements for vehicles. Automotive batteries should be inexpensive and possess long shelf lives, light weight and short recharge times. Most batteries will provide some, but not all, of these needs.

Many of the aforementioned battery design guidelines compete with each other, so that maximizing one requirement often negatively influences another requisite of design. The several competing specifications associated with vehicular battery technology have caused many to doubt whether an electrical automobile using battery power can ever realistically be a practical form of transportation in the near future.

Some have suggested replacing stored electrical power with a hybrid vehicle system. Such hybrid systems are designed to provide electrical power with small gasoline engines that drive dynamos, which, in turn, power the electrical motors. The value of these hybrid systems is that small engines consume fuel at a much lower rate, and are ultimately less polluting, than vehicles having standard gasoline or diesel engines.

Others have suggested that hybrid vehicles only add to the complexity of vehicular design, thus increasing costs, as well as posing problems with repair and maintenance. Even advocates of these systems admit that this is not the ultimate answer; they suggest that hybrid systems combining batteries with heat engines are an interim measure in the development of truly electrical automobiles and, as such, might not merit the development costs therefor.

Other fuel-cell systems that do not store hydrogen, but rather generate it in situ can, likewise, be unsafe and impractical. Using certain hydrogen-containing chemicals can be dangerous; they are also generally expensive, as well as heavy. Utilizing metal hydrides can be expensive, particularly those that are easily reversible, because they are also easily poisoned by air and moisture that can leak into the system.

An old, now abandoned method of hydrogen generation, i.e., generating hydrogen by passing high-temperature steam over a bed of iron, can also be too expensive and impractical. The containers needed to generate and handle the high-temperature steam are too expensive. Further, the use of high-temperature steam can be dangerous.

The present invention entails the development of a new hydrogen-air fuel-cell system utilizing a new form of reactive iron to generate the hydrogen needed for the hydrogen-oxygen reaction.

The iron of this invention is uniquely comprised of freshly ground particles that increase the reactivity of the iron, so that it is able to react rapidly in a water/iron or steam/iron reaction at a lower-than-normal temperature.

The iron particles are ground when the vehicle is initially powered and throughout vehicular operation. The instantaneous grinding of the iron particles in situ is necessitated because iron becomes rapidly oxidized after grinding. (As early as fifteen minutes after grinding, iron will lose its enhanced reactivity.) Therefore, after the initial grinding, grinding should continue onboard the vehicle or, alternatively, by periodically injecting freshly-ground iron fuel charges from sealed packets.

The inventive iron produces hydrogen at safer and more practical water or steam temperatures than heretofore achieved; it then supplies the hydrogen to the fuel cell for immediate consumption. When fed to the fuel cell, the generated hydrogen will react with the oxygen from the air. This fuel cell reaction will generate the needed electricity to power the drive motors of the vehicle, as well as provide at least some of the replacement water needed to produce subsequent hydrogen from the iron bed.

This inventive method is a cost-effective hydrogen generation scheme, since the lower-than-normal temperature of the water or steam reaction does not require large amounts of energy input to initiate the reaction, nor are complex and costly piping needed in order to convey the fluids.

The freshly-ground, reactive iron is easily deposited in a compartment in the vehicle. The iron is easily handled as sealed packet(s) of freshly-ground particulates, but it can, additionally, be freshly ground in situ aboard the vehicle. The particles range in diameter size from approximately 25 to 1,200 µm; an average-sized distribution is one in which at least twenty per cent (20%) of the particles are less than 300 µm in diameter. It is preferable that at least 50% are less than 300 µm in diameter. The average particle density ranges approximately from about 1 to 7.8 g/cc, with a non-compressed packed particle density ranging from about 1.5 to 3 g/cc. The particles have a surface area greater than approximately 0.001 meters$^2$/g.

SUMMARY OF THE INVENTION

In accordance with the new iron material of this invention, there is also provided a system and a method for operating an electrical automotive vehicle. The system of the invention comprises an electrically-powered automotive vehicle having electrical drive motors.

The electricity to power the drive motors is supplied onboard by a hydrogen-air fuel cell and a surge battery, with the former being operated by a hydrogen-oxygen reaction. The hydrogen for fueling the fuel cell is generated onboard the automobile, in situ, by using a first storage compartment containing the inventive iron, and a second compartment comprising a fluidized iron bed. The iron from the first storage compartment is delivered to the fluidized bed in the second compartment. The service station attendant at an iron fuel station places a fresh charge of iron for the first storage compartment into the vehicle. The iron charge can consist of pellets, a porous web or particles of iron. The first storage compartment contains means for grinding the iron particles, so that their reactivity with respect to water or steam will become enhanced. The iron in the fluidized bed of the second storage compartment can also be vibrated, mixed or stirred by tumbling. There is also a bin for the spent iron oxide which is removed by the service attendant.

The vehicle has a third storage compartment or tank for containing a supply of water, as well as means for heating the water to reactive water temperatures or steam. The heated water or steam is conveyed from the third compartment or water tank to the second compartment, where it reacts with the iron bed to form hydrogen and iron oxide. The hydrogen is conveyed to the fuel cell, where it reacts with oxygen from the air to generate the electricity for powering the drive motors of the vehicle, as well as provide water for replenishing the water tank, at least in part. The operator of the vehicle periodically brings it to a fuel station where the iron oxide formed in the bed is replaced by a new, fresh charge of iron.

The exchange of the iron oxide with a fresh iron charge at the fuel station can function in a manner that is similar to that of the current process for returning empty soda cans to a supermarket. For the spent iron (iron oxide), the fuel station would give the vehicle operator a cash allowance toward the purchase of a new iron charge. The old, spent iron would then be recycled into fresh iron by a reduction process at the fuel station or at a central distribution facility. The major difference between the supermarket recycling exchange scheme and the exchange system of this invention is that the exchange of iron materials is accomplished by the use of automated machinery, as is done at gasoline pumping stations.

The iron materials of this invention comprise in situ freshly-ground particulates. The particles range in diameter size from approximately 25 to 1,200 μm; an average-sized distribution is one in which at least twenty per cent (20%) of the particles are less than 300 μm in diameter. It is preferable that least 50% are less than 300 μm in diameter. The average particle density ranges approximately from about 1 to 7.8 g/cc, with a non-compressed packed particle density ranging from about 1.5 to 3 g/cc. The particles have a surface area greater than approximately 0.001 meters$^2$/g.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features an electrical vehicle system and method, using a hydrogen-air fuel cell to generate the electricity needed to power the electrical drive motors. Hydrogen to supply the fuel cell is produced in situ by passing low-temperature, heated water or steam over an activated iron bed containing freshly ground particles of iron.

Figure 1:
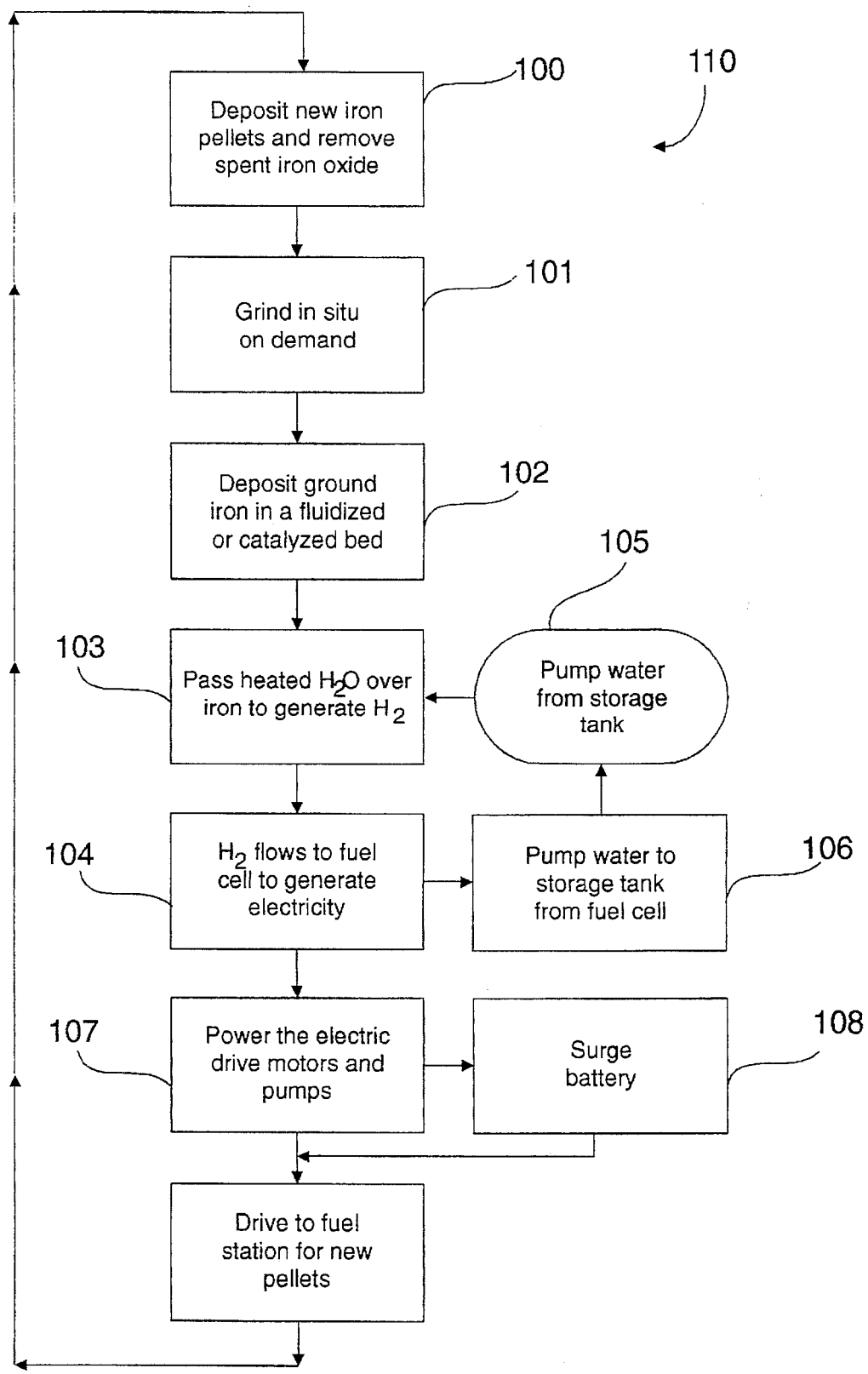
FIG. 1 illustrates a flowchart diagram of a method using the inventive iron composition of this invention.

Now referring to FIG. 1, a flowchart diagram 110 of the inventive method is shown. The operator of an electrical vehicle having electrical drive motors for driving the automobile, not shown, obtains a fresh charge of fuel, step 100, from a fuel station, at which the spent iron oxide from the vehicle is removed, and fresh iron is added. The fresh charge of iron is in the form of particles or pellets. The iron is kept reactive by the periodic grinding of the iron fuel deposited in the iron compartment, step 101. The grinding of the iron from the fuel storage compartment makes the iron more reactive, so that the conversion of the iron to iron oxide, which is measured in percent per minute (%/min.), can take place rapidly at lower-than-normal water or steam temperatures, as illustrated below in Table 1. The compartment itself can also be tumbled, so as to mix or stir the iron.

TABLE 1

| $H_2O$ Temp. (°C.) | Conv. Rate (Ground) | Conv. Rate (Unground) |
|---|---|---|
| 400 | 11.5 | 3.7 |
| 300 | 4.0 | 1.8 |
| 200 | 2.4 | 0.8 |

The ground iron is then deposited in a fluidized bed, step 102.

The hydrogen is generated in situ by passing heated water or low-temperature steam over the freshly ground iron in the fluidized bed, step 103.

The vehicle is equipped with a hydrogen-air fuel cell that operates by a hydrogen-oxygen reaction to produce electricity and replacement water.

The generated hydrogen is pumped to the hydrogen-air fuel cell, step 104, where electricity is generated, along with water. The water produced by the fuel cell is pumped step 106, to a third compartment or water tank, shown as reference numeral 105. This water is used to replenish at least some of the water used to generate the hydrogen, step 103. A water-soluble catalyst can also be added to the water tank to enhance the hydrogen-producing reaction (step 103), but this scheme would then replace the fluidized bed with a reactor that would circulate the water-soluble catalyst through the reactor bed.

The generated electricity of the fuel cell is used, step 107, either directly or in combination with a surge battery (reference numeral 108) to power the drive motors of the electrical vehicle and the various pumps and accessories. The operator of the vehicle eventually drives to the fuel station to obtain a new charge of iron, step 109, when the majority of the fuel (iron) has been spent (i.e., converted to iron oxide). The automotive power process is then essentially repeated.

Figure 2:
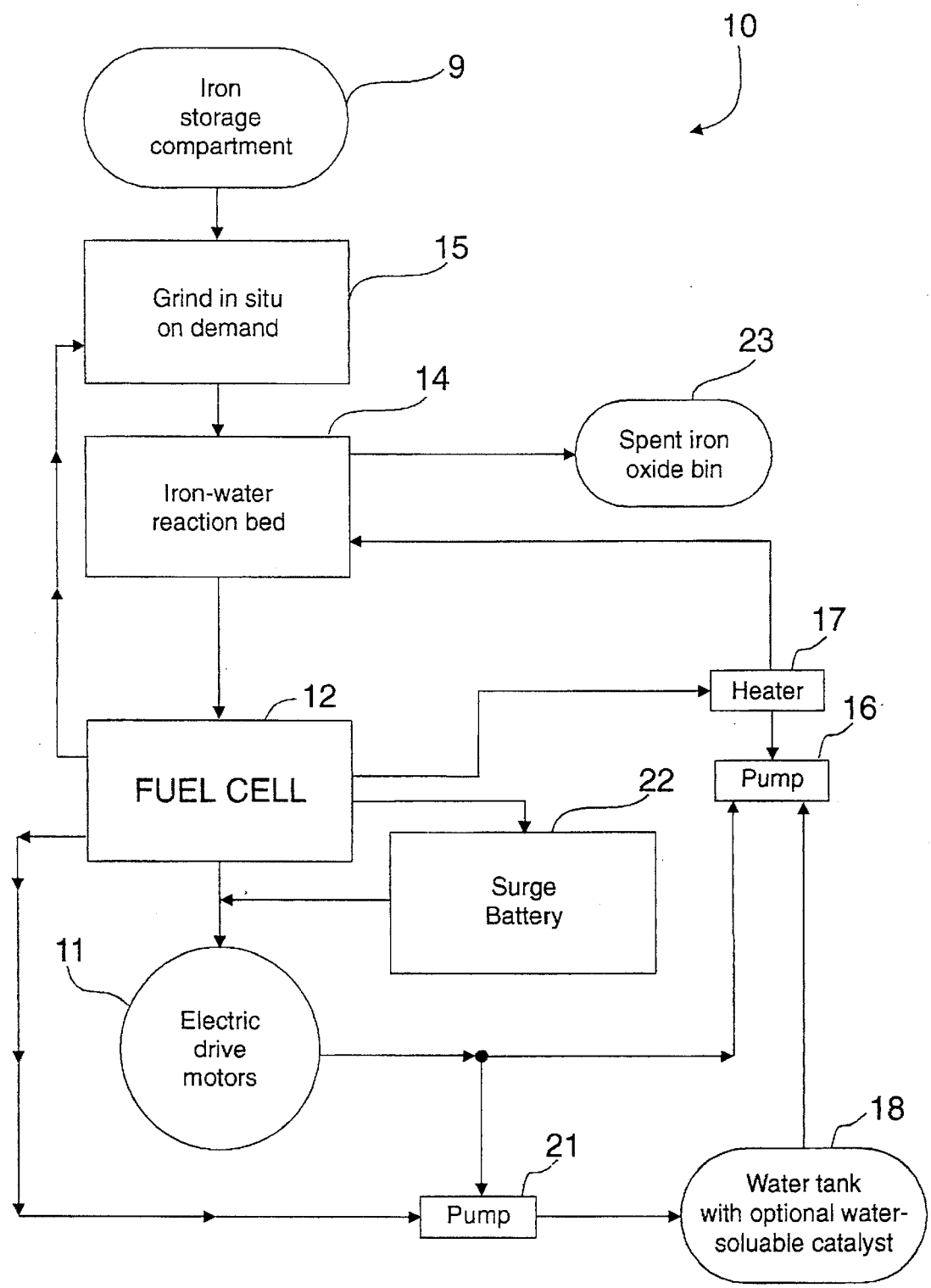
FIG. 2 depicts a schematic diagram of the system of an electrical vehicle that utilizes the new iron composition of the invention.

Referring to FIG. 2, a schematic diagram 10 of the system for the electrical vehicle of this invention is shown. The vehicular system comprises a number of drive motors 11 that receive their electrical power from a hydrogen-air fuel cell 12, over line 13. The fuel cell 12 receives the hydrogen necessary for its hydrogen-oxygen reaction from a compartment 14 that contains an iron bed. A grinding apparatus 15 periodically supplies and refreshes the iron reaction bed with activated iron, which is obtained from the storage compartment 9. Water is pumped from a water tank 18 via pump 16 to the iron-water reaction bed 14. The water is heated to the proper temperature for reaction by (for example) a heating coil heater 17 as it is pumped to the iron bed 14, or by the exotherm of the iron-water reaction via a heat exchanger.

The hydrogen that is produced in compartment 14 flows to the fuel cell 12, in order to produce electricity. In producing the electricity, the fuel cell 12 provides water as a by-product. This by-product water is pumped via pump 21 or flows by gravity to the water tank 18 in order to replenish some of the water pumped to compartment 14. Additional water may have to be periodically added to tank 18 so as to maintain a proper supply level. The electricity produced by the fuel cell 12 is also used to power the respective pumps 16 and 21, as well as the coil heater 17 and the grinding apparatus 15. (For purposes of clarity, suitable electrical connections among the fuel cell 12 and electrically-driven components are not shown in FIG. 2.)

A small surge battery 22 can be used to power the system during the initial, start-up sequence of operation and during peak load demand. This battery 22 can be recharged by the fuel cell 12 during steady-state operation, during coasting, braking or at idle (standstill). The iron oxide (spent iron) from the reaction bed 14 is delivered to a spent-iron bin 23, which is periodically emptied when new iron fuel is introduced into the iron storage compartment 9.

According to the present invention, compartment 14 generally comprises one or more tubes, not shown, that are filled with a porous or powdered metal. The tubes are preferably made from materials that conduct heat, although in certain embodiments of the present invention (whereby start-up heat is generated internally, such as by air injection), heat-conductive materials are not necessary. Preferably, the tubes are made from materials such as inconel or stainless steel. The size of the tubes will, of course, depend upon the size of the generating system. However, they generally have an inside diameter of at least about ¼ inch (0.635 cm) and a length of at least about 6 inches (15 cm). The number of tubes will also vary, depending upon the size of the system. The general range is from about 1 to 100 tubes; the more preferable range is from about 1 to 5. The tubes may also be of varying sizes and shapes, including curves, spirals, etc. The tubes may also be disposed at various angles.

The iron materials of this invention comprise in situ freshly ground particulates. The particles range in diameter size from approximately 25 to 1,200 μm; an average-sized distribution is one in which at least twenty per cent (20%) of the particles are less than 300 μm in diameter. It is preferable that at least 50% are less than 300 μm in diameter. The average particle density ranges approximately from about 1 to 7.8 g/cc, with a non-compressed packed particle density ranging from about 1.5 to 3 g/cc. The particles have a surface area greater than approximately 0.001 meters$^2$/g.

To initiate the reaction, the water in the container 18 is heated to form, in most cases, steam. However, the present invention also contemplates the use of heated water instead of steam, by using a catalyst. The water flows into and reacts with the metal reactant to produce a metal oxide, such as $Fe_3O_4$ and hydrogen gas. In the case of sponge iron or iron, the reaction occurs at temperatures of from about 100° C. to 900° C. Lower temperatures (e.g., below about 500° C.) generally result from more active, freshly-ground iron or from the use of a catalyst, without which the reaction would be too slow to be practical.

One way to start the hydrogen-producing reaction is to inject water and air into the reactor zone, so that the rapid oxidation of the metal and the catalytic burning of the hydrogen (produced by the reacting water) will help heat the metal reactor up to the necessary temperature for reaction. Another way to supply the necessary start-up heat is to burn a small amount of conventional fuel (such as compressed natural gas, propane or gasoline) in a separate burner, employing a suitable means to transport the generated heat. A simple source of start-up heat may be a small storage battery that furnishes power to a heating bulb or heating coil that is disposed within or adjacent to the energy-producing device.

A more complex scheme for supplying start-up heat to the reactor zone is to employ a plurality of reactor beds in the reaction zone (such as elongated tubes containing iron reactant), with at least either one small reactor bed or beds of graduated sizes. The smallest bed is brought up to operating temperature first with a battery or a small burner; the hydrogen it produces is burned with air to form water in the fuel-cell chamber, so as to heat up the larger reaction beds.

In the case of beds of graduated sizes, the hydrogen produced by the next larger bed may be used to heat up the next larger bed, etc.

In the case of a PEM fuel cell that is hydrogen-and-air fed, waste heat is below 100° C. and generally at about 90° C. This temperature is too low for a system running at ambient atmospheric pressure, but this is obviated by mixing the subatmospheric steam produced at about 90° C., with some of the hydrogen produced by the energy-producing system on discharge. Together, these two gases will have a total pressure of one atmosphere absolute, allowing the vaporization of the water to proceed at a partial pressure of less than one atmosphere.

In cases where the discharge rate of the fuel cell or engine is low (and, thus, the bed tends to cool down) or an endotherm is needed to maintain the reaction, a variable and controlled amount of air or oxygen may be injected into the metal bed during the discharge reaction, along with steam to maintain a particular reaction temperature.

As described previously, reaction temperatures generally range from about 100° C. to about 900° C., with temperatures of about 600° C. to about 700° C. being common for iron or sponge iron metal reactor beds without activation or catalysis. Such relatively high temperatures can complicate the overall system or the vehicle in terms of materials, thermal insulation and initial heat-up time, resulting in less suitability for use in a vehicle. The inventive use of more reactive iron allows the hydrogen-generating process to be accomplished at lower temperatures, i.e., generally below 300° C. Also, a catalyst may be added to lower the hydrogen overpotential of the metal reactant in the presence of water or steam at moderate temperatures, e.g., about 80° C. to 250° C. The lower hydrogen overpotential means that the kinetics of the reaction are improved, thus allowing the reaction to take place at a lower temperature, lessening strain on the system and its complexity.

One of the advantages of the present invention over other hydrogen production systems (including metal-hydride-based systems) is its ability to regenerate or reform the spent metal oxide after completion of the reaction and the production of hydrogen. This advantage is even more significant because of the relatively low cost involved in the regeneration of spent metal oxide. The system of the present invention may employ a variety of methods to regenerate the spent metal oxide, some of which are already being used commercially.

One method of regeneration comprises reacting the spent metal oxide with a reducing gas, a mixture of gases or a liquid. Because of its relatively low cost, the presently preferred reducing agent is reformed natural gas. This gas generally comprises a mixture of hydrogen, carbon monoxide, carbon dioxide and residual steam. While hydrogen and carbon monoxide are the only active reducing agents, the metal/metal oxide bed that is being regenerated is not irreversibly harmed by the presence of the other two components. If hydrogen gas is available at a lower cost than reformed natural gas, it, too, could be used. In most cases, heat is added to the reaction, because the regeneration process is somewhat endothermic. Where available, relatively pure carbon monoxide can also be used as a reducing agent. However, this would contribute about four to five times more carbon dioxide to the atmosphere than would reformed natural gas.

The gaseous reducing agents may be supplied as a reformed liquid fuel such as reformed methanol, reformed ethanol, reformed petroleum derivatives and reformed or decomposed ammonia.

The reformed fuels may be derived by various techniques including: (1) steam-reforming (in which the fuel in gaseous form reacts with steam); (2) partial oxidation (in which the fuel reacts with oxygen or air in proportions less than that needed for complete oxidation); or (3) autothermal reforming (in which the fuel partially reacts with steam and partially with oxygen or air). In terms of yield of hydrogen per unit of fuel, steam-reforming is more efficient than partial oxidation. Steam-reforming is endothermic, while partial oxidation is exothermic. With regard to both hydrogen yield and heat addition/removal, autothermal reforming falls between steam-reforming and partial oxidation. The selection of a particular reforming process will thus be made for a particular operation based upon factors which include the hydrogen yield required, equipment costs and complexity, and the overall process heat requirements.

Heat must be supplied to the reduction reaction, since the reduction reaction is generally endothermic, taking place at about 800° C. to 1,100° C. One method of doing this is to inject air or oxygen into the reactor bed. This causes some of the reducing agent to burn, thereby heating up the regeneration reaction zone, i.e., autothermal reforming. Another method is to burn the vent gas from a hydrogen-producing reaction and transfer its combustion heat to the regeneration reaction zone through the walls of the reactor. Still another method is to burn part of the reducing agent upstream of the reforming device and transfer the combustion heat across the reactor bed walls of the metal/metal-oxide containing reactor. Another approach is to make the reaction of the reducing agent and the metal oxide exothermic, which can be accomplished by maintaining enough carbon monoxide in the reducing gas mixture to make the sum of the reduction reactions slightly exothermic. Still another scheme for supplying the necessary heat to maintain the regenerating reaction is to burn vent gas from another nearby regenerating bed. This vent gas normally contains steam, carbon dioxide and unreacted reformate.

In general, the vent gas from the reaction between iron oxide and reformate does not only produce a mixture of water and carbon dioxide. The equilibrium composition of the vent gas also includes unreacted hydrogen and unreacted carbon monoxide. Some of the unreacted reducing mixture can be burned, so as to satisfy the endothermic need of either the iron oxide reaction or the reformer reaction, but if all of it were burned or vented, the overall efficiency would go down. To avoid this, some water may be condensed from the vent gas; the resulting, drier mixture may then be fed to a second-stage iron oxide regenerator to produce more elemental iron. The vent gas of the second stage would then be burned to provide the needed endotherms, and the overall efficiency would be better than that of a single-stage regenerator.

The reformation process may be carried out at a location away from the fuel station, such as at a central plant. The metal and spent metal oxides may be transferred to and from refueling stations near the site of the central station. The metal powder or material is preferably conveyed into and out of the metal-water reaction chamber 14 during refueling by a suitable means, such as gravity flow. The metal and metal oxides are transferred from the refueling stations to the central reforming plant by a variety of means (including trucking, railroad car and the like). The recycling of the metal reactant can theoretically occur an infinite number of times.

As an alternative to using a relatively large, removed central processing facility for reforming the spent metal oxide, smaller reformer units at the site of the refueling station may be used. As with the centralized reforming unit, the on-site reforming units may be used to convert the spent metal oxide to metal reactant (as previously described) by using, for example, reformed natural gas.

A small amount of hydrogen generated from the iron-water reaction can be compressed and stored for start-up/heat-up purposes. The hydrogen is diverted by means of a solenoid valve that is controlled by a pressure sensor or pressure switch. The hydrogen storage device acts like a storage battery, supplying energy during start-up and absorbing it during normal driving for later use.

During the regeneration of spent metal oxide, the reformed natural gas may contain sulfur impurities, which may accumulate in the bed over many regeneration cycles. The sulfur will react with the metal reactant, creating metal sulfides. The metal sulfides might not decompose either by steam upon discharge or by fuel or reformate upon recharge. This will eventually irreversibly tie up a large fraction of the metal reactant bed as metal sulfides instead, thereby preventing it from switching from metal oxide to elemental metal. In order to overcome this contamination problem, unwanted metal sulfide (e.g., FeS) can be converted to sulfur dioxide ($SO_2$) and some metal oxide (e.g., one of the iron oxides) by briefly (i.e., in 1 to 15 minutes) passing a stream of air over the heated bed of spent metal oxide before that bed is reduced to elemental metal. Since the bed must be heated anyway, in order to regenerate it, little or no additional heating is needed to remove the metal sulfide by hot air oxidation. The risk of explosion during transition through the bed from air to reformate or fuel can be significantly reduced by briefly purging the bed with steam, carbon dioxide, nitrogen or any other suitable inert gas. In particular, the mixture of steam and $CO_2$ from another bed undergoing regeneration is a readily available, essentially cost-free, purging agent.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A new iron material for use in situ with a hydrogen-air fuel cell, to generate the hydrogen to fuel said fuel cell, said iron material comprising freshly ground particles of iron ranging in diameter size from approximately 25 to 1,200 μm, with an average-sized distribution having at least twenty per cent (20%) of the particles less than 300 μm in diameter, and having an average particle density ranging approximately from about 1 to 7.8 g/cc, and a surface area greater than approximately 0.001 meters$^2$/g, said particles being in a freshly ground state in situ for enhancing their reactivity in producing hydrogen for said fuel cell.

2. The new iron material in accordance with claim 1, wherein said iron particles have a non-compressed packed particle density ranging from about 1.5 to 3 g/cc.

3. The new iron material in accordance with claim 1, wherein at least 50% of the particles are less than 300 μm in diameter.

4. The new iron material in accordance with claim 1, wherein said iron particles comprise a packet of particles for use as a refresher charge in an electrical vehicle.

5. A new iron material for use in situ with a hydrogen-air fuel cell, to generate the hydrogen to fuel said fuel cell, said iron material comprising freshly ground particles of iron ranging in diameter size from approximately 25 to 1,200 μm, with an average-sized distribution having at least fifty per cent (50%) of the particles less than 300 μm in diameter, and having an average particle density ranging approximately from about 1 to 7.8 g/cc, and a surface area greater than approximately 0.001 meters$^2$/g, said particles being freshly ground in situ for enhancing their reactivity in producing hydrogen for said fuel cell.

6. The new iron material in accordance with claim 5, wherein said iron particles have a non-compressed packed particle density ranging from about 1.5 to 3 g/cc.

7. The new iron material in accordance with claim 5, wherein said iron particles comprise a sealed packet of particles that is opened for use as a refresher charge in situ during operation of an electrical vehicle.

8. A new iron material for use in situ with a hydrogen-air fuel cell, to generate the hydrogen to fuel said fuel cell, said iron material comprising a sealed packet of freshly ground particles of iron ranging in diameter size from approximately 25 to 1,200 μm, with an average-sized distribution having at least twenty per cent (20%) of the particles less than about 300 μm in diameter, and having an average particle density approximately ranging from about 1 to 7.8 g/cc, and a surface area greater than approximately 0.001 meters$^2$/g, said particles of said sealed packet being freshly ground for enhancing their reactivity in producing hydrogen for said fuel cell.

9. The new iron material in accordance with claim 8, wherein said iron particles have a non-compressed packed particle density ranging from about 1.5 to 3 g/cc.

* * * * *